United States Patent
Igarashi et al.

(10) Patent No.: US 8,547,656 B2
(45) Date of Patent: Oct. 1, 2013

(54) SPIN-TORQUE OSCILLATOR (STO) FOR MICROWAVE-ASSISTED MAGNETIC RECORDING (MAMR) AND METHODS OF USE THEREOF

(75) Inventors: Masukazu Igarashi, Kawagoe (JP); Masato Matsubara, Yokohama (JP); Keiichi Nagasaka, Isehara (JP); Masato Shiimoto, Odawara (JP)

(73) Assignee: HGST Netherlands B.V., Amsterdam (NL)

( * ) Notice: Subject to any disclaimer, the term of this patent is extended or adjusted under 35 U.S.C. 154(b) by 24 days.

(21) Appl. No.: 13/401,650

(22) Filed: Feb. 21, 2012

(65) Prior Publication Data

US 2013/0215530 A1 Aug. 22, 2013

(51) Int. Cl.
*G11B 5/02* (2006.01)

(52) U.S. Cl.
USPC .......................................... 360/59; 360/125.3

(58) Field of Classification Search
USPC .......... 360/55, 59, 125.3, 119.3, 324, 324.11, 360/313, 75
See application file for complete search history.

(56) References Cited

U.S. PATENT DOCUMENTS

| | | | |
|---|---|---|---|
| 7,791,829 B2 * | 9/2010 | Takeo et al. .................... | 360/55 |
| 7,957,098 B2 | 6/2011 | Yamada et al. | |
| 8,351,155 B2 * | 1/2013 | Contreras et al. .......... | 360/125.3 |
| 2008/0019040 A1 | 1/2008 | Zhu et al. | |
| 2009/0059423 A1 | 3/2009 | Yamada et al. | |
| 2009/0134922 A1 | 5/2009 | Chen | |
| 2009/0310244 A1 | 12/2009 | Shimazawa et al. | |
| 2010/0007992 A1 | 1/2010 | Yamada et al. | |
| 2010/0007996 A1 | 1/2010 | Iwasaki et al. | |
| 2010/0220415 A1 | 9/2010 | Yamada et al. | |
| 2010/0232053 A1 | 9/2010 | Yano et al. | |
| 2011/0038080 A1 | 2/2011 | Alex et al. | |
| 2011/0038081 A1 | 2/2011 | Contreras et al. | |
| 2011/0128648 A1 | 6/2011 | Ezawa et al. | |

FOREIGN PATENT DOCUMENTS

| | | |
|---|---|---|
| JP | 2009070541 A2 | 4/2009 |
| JP | 2010510082 T2 | 4/2010 |

OTHER PUBLICATIONS

Zhu et al., "Microwave Assisted Magnetic Recording Utilizing Perpendicular Spin Torque Oscillator With Switchable Perpendicular Electrodes," 2010 IEEE, IEEE Transactions on Magnetics, vol. 46, No. 3, Mar. 2010, pp. 751-757.

* cited by examiner

*Primary Examiner* — Nabil Hindi
(74) *Attorney, Agent, or Firm* — Zilka-Kotab, PC

(57) ABSTRACT

In one embodiment, a magnetic data storage system includes a main pole power supply adapted for supplying an excitation current to a main pole coil, a microwave-assisted magnetic recording (MAMR) device including a spin-torque oscillator (STO) element, the STO element having a field generation layer (FGL) and a polarization layer, a timing-control circuit adapted for determining a duration of a main pole magnetic moment inversion process and signaling a start of the main pole magnetic moment inversion process, and a current-regulating circuit comprising an STO power supply adapted for supplying current to the STO element, wherein the STO power supply prevents degradation of a single rotating magnetic domain structure in the FGL into a closure magnetic domain structure in the FGL. Other systems and methods for preventing degradation of the single rotating magnetic domain structure in the FGL into a closure magnetic domain structure are described for more embodiments.

20 Claims, 21 Drawing Sheets

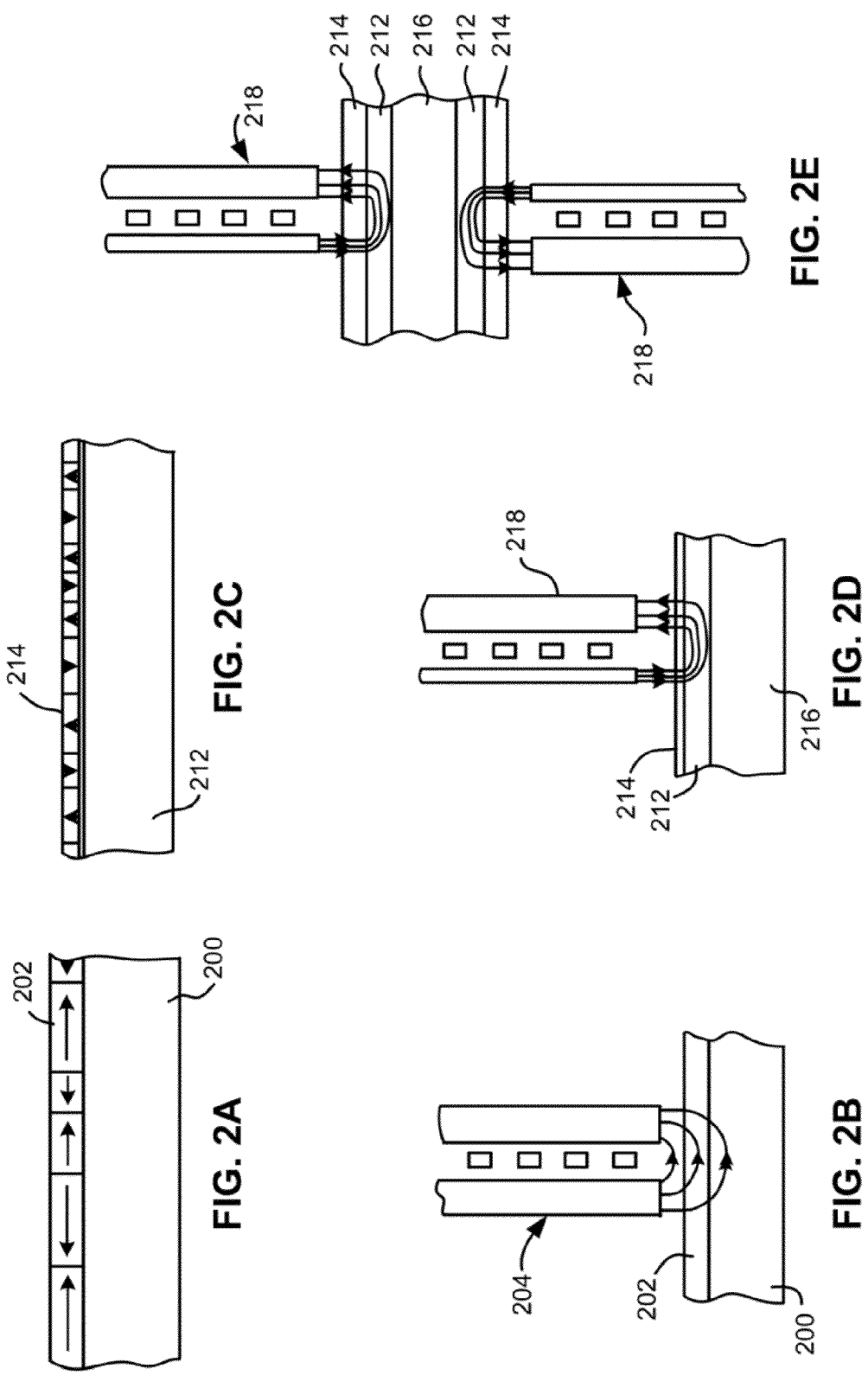

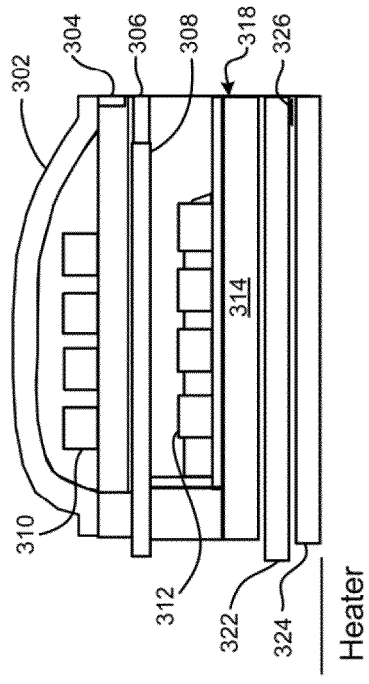
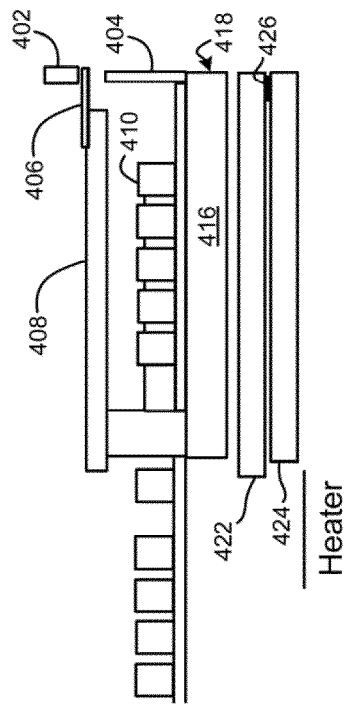
FIG. 3B
FIG. 4B
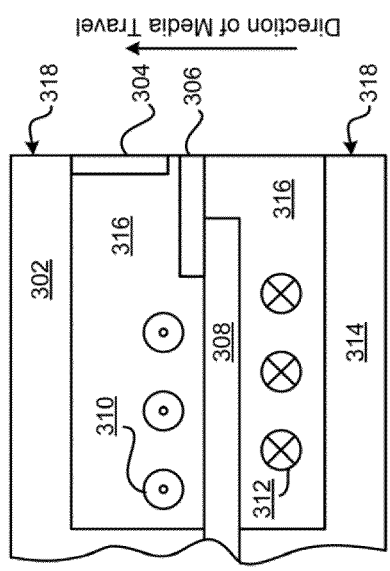
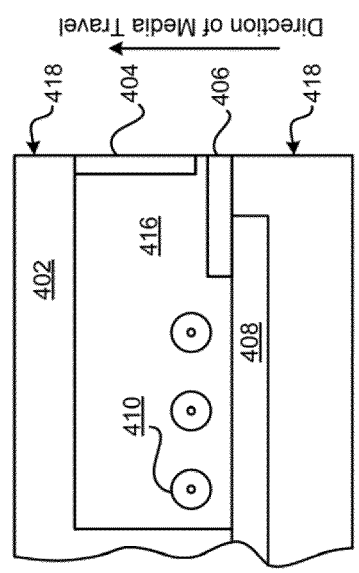
FIG. 3A
FIG. 4A

SPIN-TORQUE OSCILLATOR (STO) FOR MICROWAVE-ASSISTED MAGNETIC RECORDING (MAMR) AND METHODS OF USE THEREOF

FIELD OF THE INVENTION

The present invention relates to magnetic heads for data recording, and more particularly, this invention relates to regulating magnetic domain structures in spin-torque oscillators used in magnetic heads.

The heart of a computer is a magnetic hard disk drive (HDD) which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing, a slight distance from the surface of the rotating disk. When the slider rides on the air bearing the write and read heads are employed for writing data to and reading data from the rotating disk. The read and write heads are connected to processing circuitry that operates according to logic for implementing the writing and reading functions.

The volume of information processing in the information age is increasing rapidly. In particular, HDDs have been used to store more information in their limited area and volume. A technical approach to solve this is to increase the capacity by increasing the recording density of the HDD. To achieve higher recording density, further miniaturization of recording bits is effective, which in turn typically requires the design of smaller and smaller components.

The further miniaturization of the various components, however, presents its own set of challenges and obstacles. The improvements in the capabilities of computers and the increases in computer network speed and capacity that have occurred in recent years have been accompanied by a dramatic increase in the volume of information distributed in a digital data format. The efficient receipt/transmission and extraction of such a large volume of information requires storage devices with the capacity to input and output a large volume of data.

Increases in the recording density of magnetic disks have revealed the associated problem of a gradual reduction in recorded signal levels attributable to thermal fluctuation. The reason for this resides in the constitution of magnetic recording media as magnetic body microcrystalline aggregates, and the reduction in the volume of the microcrystals. To ensure adequate thermal fluctuation stability, it is felt that the commonly employed indices of thermal fluctuation $K\beta(=K_u V/kT$; where $K_u$: magnetic anisotropy, V: particle volume, T: absolute temperature, and k: Boltzmann constant) should be at least 70. Moreover, if the magnetic anisotropy ($K_u$ of the material) and the temperature (T of the environment) are both fixed, the smaller the value of the particle volume (V) is, then the more likely magnetization inversion will be produced by thermal fluctuation.

As recording densities have increased and the volume of the recording film occupied by a single bit has decreased, an inevitable increase in the value of V which, in turn, renders thermal fluctuation unavoidable has resulted. When $K_u$ has been increased for the purpose of suppressing thermal fluctuation, the magnetization-inverted magnetic field required for magnetic recording extends beyond the recording magnetic field that is able to be generated by the recording head, and renders recording impossible.

Previous attempts have been made to develop a microwave-assisted magnetic recording (MAMR) technique designed to resolve this problem. As depicted in FIG. 5, MAMR includes a vertical magnetic recording head and a microwave magnetic field from a spin-torque oscillator (STO) 504. The recording process involves an application of a write magnetic field from a main magnetic pole, to the MAMR.

The STO 504 includes a field generation layer (FGL) 506, and a polarization layer 508. It can also be seen that the STO 504 is arranged adjacent to a main magnetic pole 510, a trailing shield 512, and a magnetic recording medium 514 of large magnetic anisotropy which, as a result, establishes a state of magnetic resonance across the target region for recording on the magnetic recording medium 514. This in turn causes the magnetization to fluctuate and the magnetization-inverted magnetic field to drop.

Conventional magnetic heads render recording possible on the microwave-irradiated region of a magnetic recording medium correspond to a high recording density in excess of about 1 Tbit/in$^2$ where the recording magnetic field is lacking and recording is difficult. The STO generates high-frequency magnetic fields, or microwaves, as a result of the transfer of spin torque from a polarization layer through Cu to an adjacent high-frequency magnetic FGL, and the in-plane high-speed rotation of the magnetization of the FGL serving as the in-plane free layer. At this time, the magnetization of the FGL is rotated about an axis in the perpendicular direction at an equilibrium angle between the gap magnetic field and the spin torque from the polarization layer. When the two are in equilibrium in the opposite orientation, complete in-plane rotation of the magnetization of the FGL occurs and, accordingly, the generated high-frequency magnetic field is its strongest.

In addition, FIGS. 6A-6B depict inversion characteristics of a recording medium. As shown, for the MAMR to utilize the magnetic resonance phenomenon, the effective microwave magnetic field component constitutes an anti-clockwise rotating magnetic field component of direction of rotation, or chirality which is the same as the precession motion of the recording medium magnetization.

When the FGL of FIG. 5 is employed, the microwave magnetic field constitutes an elliptical rotating magnetic field of a chirality which is dependent upon the chirality of the magnetization of the FGL, and is opposingly rotated at the front and rear of the FGL as seen from the movement direction of the head, as shown in FIG. 7. Accordingly, the effective anti-clockwise rotating magnetic field in the MAMR is generated at the front and rear edge sides of the FGL. For this reason, whenever the polarity of the main magnetic pole is inverted, the chirality of the magnetization of the FGL must be inverted. In various approaches, the thickness $t_1$ may be from about 5 nm to about 20 nm, but may be higher or lower based on the desired application. In other approaches, the thickness $t_2$ may be from about 10 nm to about 50 nm, but may be higher or lower based on the desired application.

The location of application of the effective anti-clockwise rotating magnetic field separates from and approaches the main magnetic pole according to the polarity of the main magnetic pole, and this is a factor in the difficulty associated with high-density recording. Previous attempts have been made to develop systems for inverting the magnetization of a polarization layer serving as the source of spin torque in accordance with the magnetic field $H_{ext}$ of the main magnetic pole while maintaining a constant STO current.

SUMMARY

In one embodiment, a magnetic data storage system includes a main pole power supply adapted for supplying an excitation current to a main pole coil, a microwave-assisted magnetic recording (MAMR) device including a spin-torque oscillator (STO) element, the STO element having a field generation layer (FGL) and a polarization layer, a timing-control circuit adapted for determining a duration of a main pole magnetic moment inversion process and signaling a start of the main pole magnetic moment inversion process, and a current-regulating circuit comprising an STO power supply adapted for supplying current to the STO element, wherein the STO power supply prevents degradation of a single rotating magnetic domain structure in the FGL into a closure magnetic domain structure in the FGL.

In another embodiment, a method includes supplying an excitation current to a main pole coil, supplying a current to a STO element of a MAMR device, the STO element having a FGL and a polarization layer, determining a duration of a main pole magnetic moment inversion process, signaling a start of the main pole magnetic moment inversion process, and regulating the STO current for the duration of the main pole magnetic moment inversion process, wherein regulating the STO current prevents degradation of a single rotating magnetic domain structure in the FGL into a closure magnetic domain structure in the FGL.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 2A is a schematic representation in section of a recording medium utilizing a longitudinal recording format.

FIG. 2B is a schematic representation of a conventional magnetic recording head and recording medium combination for longitudinal recording as in FIG. 2A.

FIG. 2C is a magnetic recording medium utilizing a perpendicular recording format.

FIG. 2D is a schematic representation of a recording head and recording medium combination for perpendicular recording on one side.

FIG. 2E is a schematic representation of a recording apparatus adapted for recording separately on both sides of the medium.

FIG. 3A is a cross-sectional view of one particular embodiment of a perpendicular magnetic head with helical coils.

FIG. 3B is a cross-sectional view of one particular embodiment of a piggyback magnetic head with helical coils.

FIG. 4A is a cross-sectional view of one particular embodiment of a perpendicular magnetic head with looped coils.

FIG. 4B is a cross-sectional view of one particular embodiment of a piggyback magnetic head with looped coils.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified.

The following description discloses several preferred embodiments of disk-based storage systems and/or related systems and methods, as well as operation and/or component parts thereof.

In one general embodiment, a magnetic data storage system includes a main pole power supply adapted for supplying an excitation current to a main pole coil, a microwave-assisted magnetic recording (MAMR) device including a spin-torque oscillator (STO) element, the STO element having a field generation layer (FGL) and a polarization layer, a timing-control circuit adapted for determining a duration of a main pole magnetic moment inversion process and signaling a start of the main pole magnetic moment inversion process, and a current-regulating circuit comprising an STO power supply adapted for supplying current to the STO element, wherein the STO power supply prevents degradation of a single rotating magnetic domain structure in the FGL into a closure magnetic domain structure in the FGL.

In another general embodiment, a method includes supplying an excitation current to a main pole coil, supplying a current to a STO element of a MAMR device, the STO element having a FGL and a polarization layer, determining a duration of a main pole magnetic moment inversion process, signaling a start of the main pole magnetic moment inversion process, and regulating the STO current for the duration of the main pole magnetic moment inversion process, wherein regulating the STO current prevents degradation of a single rotating magnetic domain structure in the FGL into a closure magnetic domain structure in the FGL.

Figure 1:
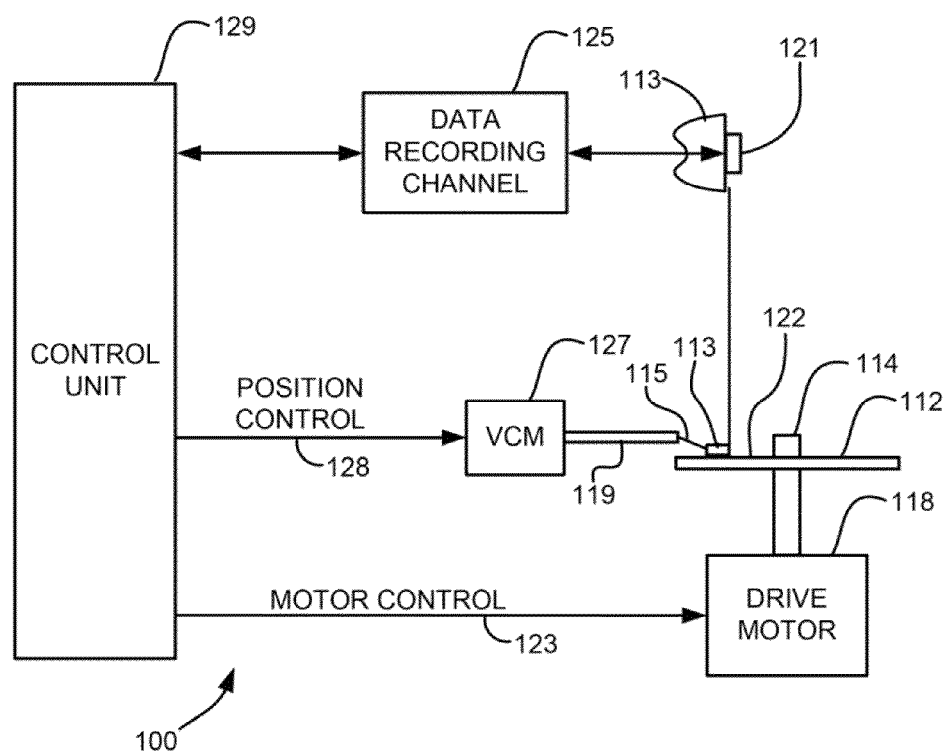
FIG. 1 is a simplified drawing of a magnetic recording disk drive system.
Figure 5:
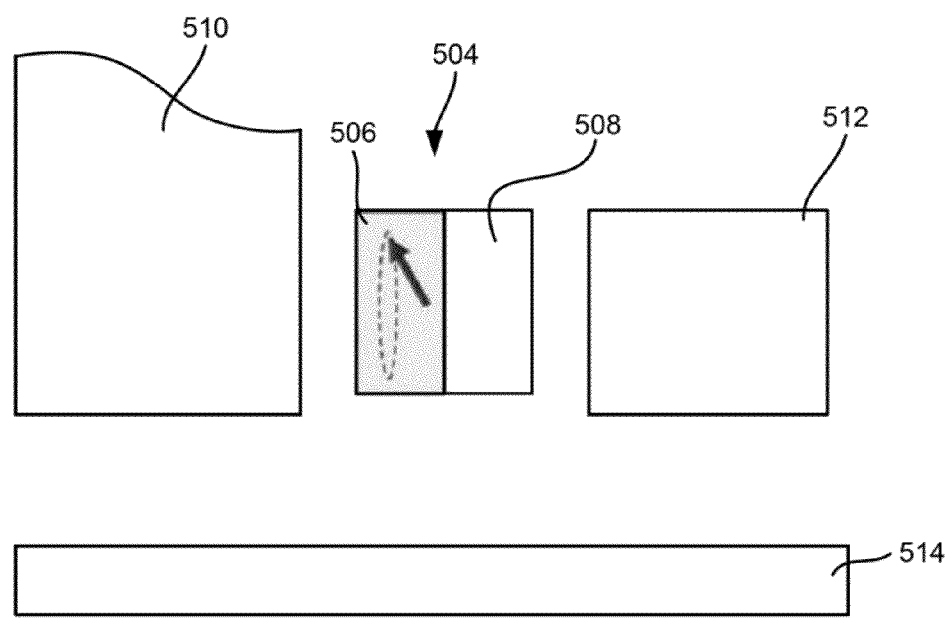
FIG. 5 is a partial view of a microwave-assisted magnetic recording (MAMR) device, according to the prior art.
Figure 6B:
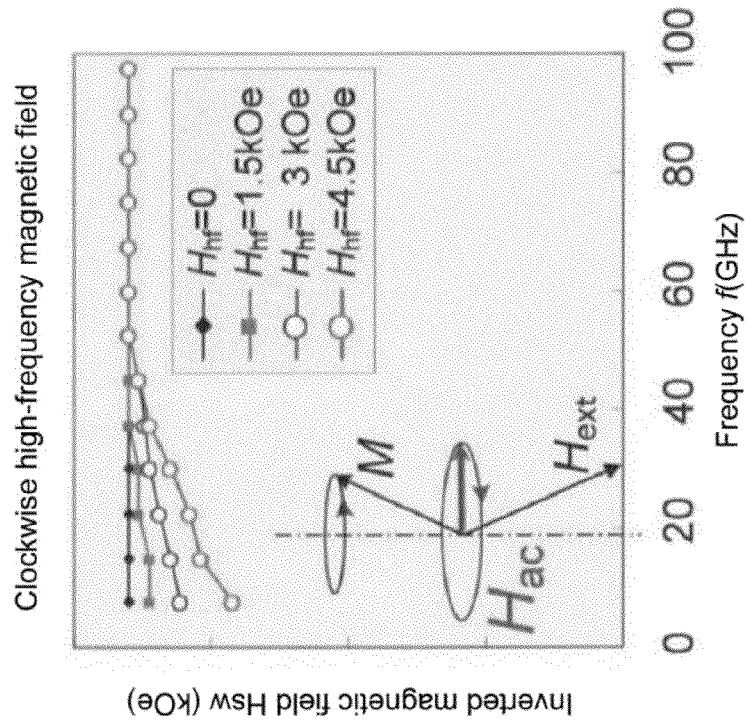
FIG. 6B depicts the inversion characteristics a magnetic domain structure, according to the prior art.
Figure 6A:
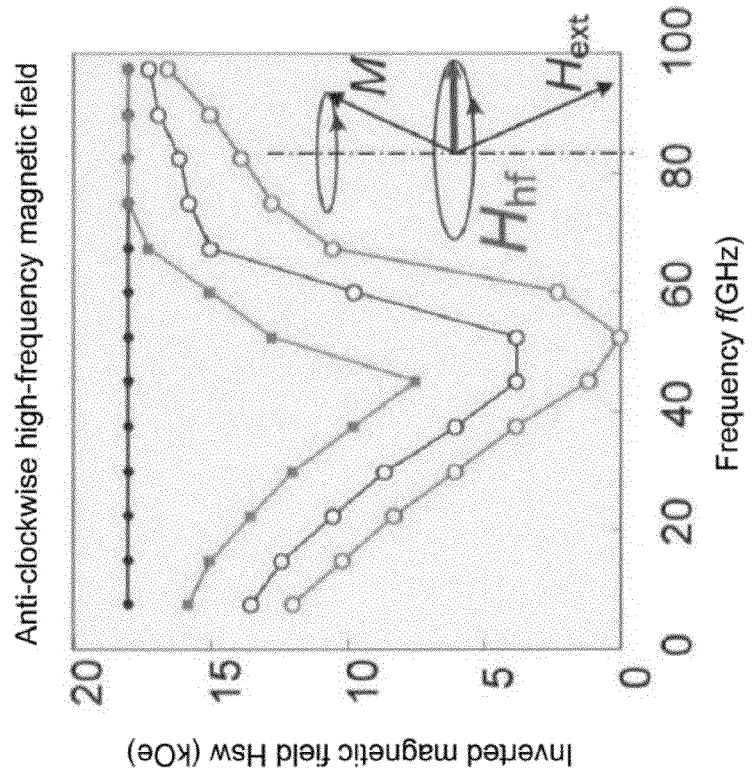
FIG. 6A depicts the inversion characteristics of a magnetic domain structure, according to the prior art.
Figure 7:
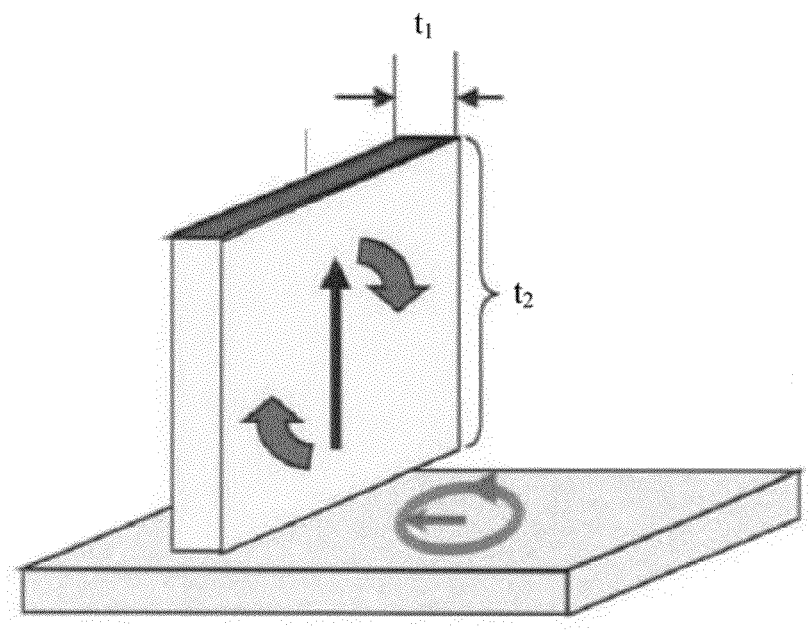
FIG. 7 depicts a high frequency field of the field generation layer (FGL) according to the prior art.

Referring now to FIG. 1, there is shown a disk drive 100 in accordance with one embodiment of the present invention. As shown in FIG. 1, at least one rotatable magnetic disk 112 is supported on a spindle 114 and rotated by a disk drive motor 118. The magnetic recording on each disk is typically in the form of an annular pattern of concentric data tracks (not shown) on the disk 112.

At least one slider 113 is positioned near the disk 112, each slider 113 supporting one or more magnetic read/write heads 121. As the disk rotates, slider 113 is moved radially in and out over disk surface 122 so that heads 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by control unit 129, such as access control signals and internal clock signals. Typically, control unit 129 comprises logic control circuits, storage (e.g., memory), and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write head includes a coil layer embedded in one or more insulation layers (insulation stack), the insulation stack being located between first and second pole piece layers. A gap is formed between the first and second pole piece layers by a gap layer at an air bearing surface (ABS) of the write head. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

FIG. 2A illustrates, schematically, a conventional recording medium such as used with magnetic disc recording systems, such as that shown in FIG. 1. This medium is utilized for recording magnetic impulses in or parallel to the plane of the medium itself. The recording medium, a recording disc in this instance, comprises basically a supporting substrate 200 of a suitable non-magnetic material such as glass, with an overlying coating 202 of a suitable and conventional magnetic layer.

FIG. 2B shows the operative relationship between a conventional recording/playback head 204, which may preferably be a thin film head, and a conventional recording medium, such as that of FIG. 2A.

FIG. 2C illustrates, schematically, the orientation of magnetic impulses substantially perpendicular to the surface of a recording medium as used with magnetic disc recording systems, such as that shown in FIG. 1. For such perpendicular recording the medium typically includes an under layer 212 of a material having a high magnetic permeability. This under layer 212 is then provided with an overlying coating 214 of magnetic material preferably having a high coercivity relative to the under layer 212.

FIG. 2D illustrates the operative relationship between a perpendicular head 218 and a recording medium. The recording medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

In this structure, the magnetic lines of flux extending between the poles of the perpendicular head 218 loop into and out of the overlying coating 214 of the recording medium with the high permeability under layer 212 of the recording medium causing the lines of flux to pass through the overlying coating 214 in a direction generally perpendicular to the surface of the medium to record information in the overlying coating 214 of magnetic material preferably having a high coercivity relative to the under layer 212 in the form of magnetic impulses having their axes of magnetization substantially perpendicular to the surface of the medium. The flux is channeled by the soft underlying coating 212 back to the return layer (Pl) of the head 218.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium, allowing for recording on each side of the medium.

FIG. 3A is a cross-sectional view of a perpendicular magnetic head. In FIG. 3A, helical coils 310 and 312 are used to create magnetic flux in the stitch pole 308, which then delivers that flux to the main pole 306. Coils 310 indicate coils extending out from the page, while coils 312 indicate coils extending into the page. Stitch pole 308 may be recessed from the ABS 318. Insulation 316 surrounds the coils and may provide support for some of the elements. The direction of the media travel, as indicated by the arrow to the right of the structure, moves the media past the lower return pole 314 first, then past the stitch pole 308, main pole 306, trailing shield 304 which may be connected to the wrap around shield (not shown), and finally past the upper return pole 302. Each of these components may have a portion in contact with the ABS 318. The ABS 318 is indicated across the right side of the structure.

Perpendicular writing is achieved by forcing flux through the stitch pole 308 into the main pole 306 and then to the surface of the disk positioned towards the ABS 318.

FIG. 3B illustrates a piggyback magnetic head having similar features to the head of FIG. 3A. Two shields 304, 314 flank the stitch pole 308 and main pole 306. Also sensor shields 322, 324 are shown. The sensor 326 is typically positioned between the sensor shields 322, 324.

FIG. 4A is a schematic diagram of one embodiment which uses looped coils 410, sometimes referred to as a pancake configuration, to provide flux to the stitch pole 408. The stitch pole then provides this flux to the main pole 406. In this orientation, the lower return pole is optional. Insulation 416 surrounds the coils 410, and may provide support for the stitch pole 408 and main pole 406. The stitch pole may be recessed from the ABS 418. The direction of the media travel, as indicated by the arrow to the right of the structure, moves the media past the stitch pole 408, main pole 406, trailing shield 404 which may be connected to the wrap around shield (not shown), and finally past the upper return pole 402 (all of which may or may not have a portion in contact with the ABS 418). The ABS 418 is indicated across the right side of the structure. The trailing shield 404 may be in contact with the main pole 406 in some embodiments.

FIG. 4B illustrates another type of piggyback magnetic head having similar features to the head of FIG. 4A including a looped coil 410, which wraps around to form a pancake coil. Also, sensor shields 422, 424 are shown. The sensor 426 is typically positioned between the sensor shields 422, 424.

In FIGS. 3B and 4B, an optional heater is shown near the non-ABS side of the magnetic head. A heater (Heater) may also be included in the magnetic heads shown in FIGS. 3A and 4A. The position of this heater may vary based on design parameters such as where the protrusion is desired, coefficients of thermal expansion of the surrounding layers, etc.

Figure 8A:
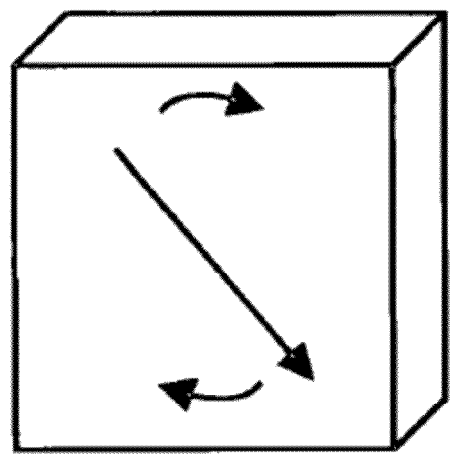
FIG. 8A depicts a single magnetic domain structure, according to one embodiment.
Figure 8B:
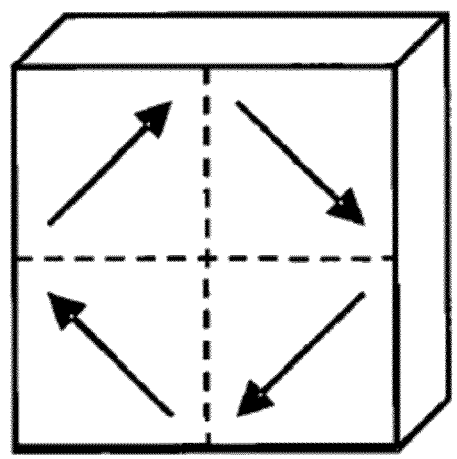
FIG. 8B depicts a closure magnetic domain structure, according to one embodiment.

Regarding the ideal single rotating domain structure, as depicted in FIG. 8A, field-generation layer (FGL) magnetization involves rotation in the perpendicular direction at an equilibrium angle between the gap magnetic field and the spin torque from the polarization layer. Moreover, without wishing to be bound by any theory, it is believed that when the balance between the gap magnetic field and the spin torque is lost, closure magnetic domains tend to form easily in the FGL as depicted by FIG. 8B. However, if closure magnetic domains are formed in the FGL, the magnetization at the side surfaces of the FGL decreases thus weakening the strength of the high-frequency magnetic field which, in turn, inhibits the production of an adequate microwave-assisting effect. Once closure magnetic domains are formed, in normal write processing, the original single magnetic domain state as shown in FIG. 8A is not easily restored.

In one embodiment, a system may be able to suppress the generation of closure magnetic domain structures, particularly during a main pole magnetic moment inversion process. As referenced herein, a main pole magnetic moment inversion process refers to the entire chain of events occurring from the instant that a main pole magnetic moment begins to transition from a first polarity state (e.g., an "up" or "down" state) to the opposite polarity state (e.g., the opposite of the "up" or "down" state) until the instant that the main pole magnetic moment completes the transition from the first polarity state (e.g., the "up" or "down" state) to the opposite polarity state (e.g., the opposite of the "up" or "down" state).

In more embodiments, the system may also create a single magnetic domain even if closure magnetic domains have been generated, ideally including a drive system for a spin-torque oscillator of high reliability and reduced cost that is ideal for use in super high-density MAMR devices.

Figure 9:
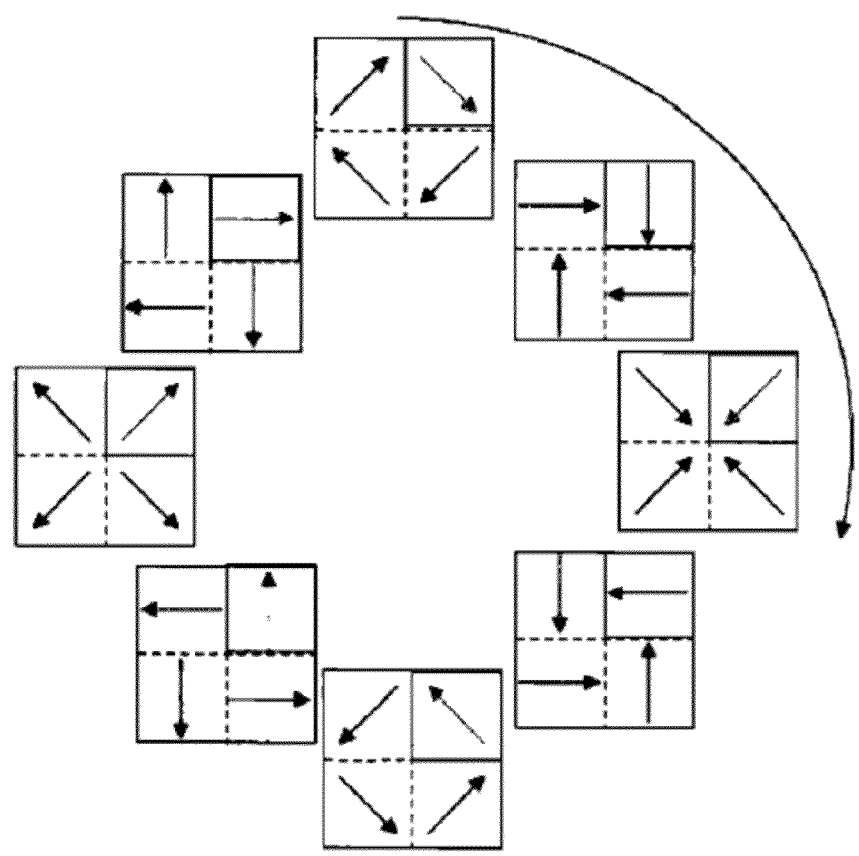
FIG. 9 depicts changes over time to a closure magnetic domain structure, according to one embodiment.
Figure 10B:
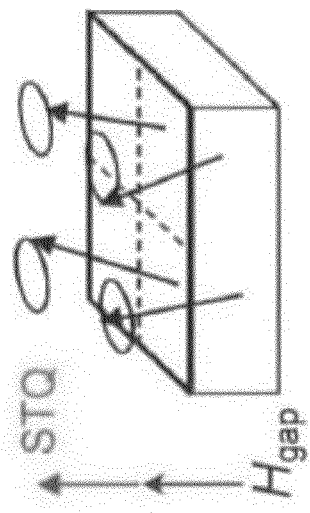
FIG. 10B depicts a closure magnetic domain state, according to one embodiment.
Figure 10A:
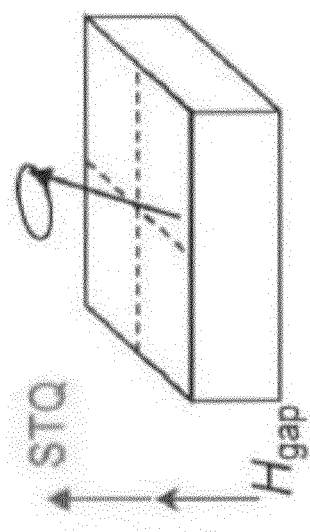
FIG. 10A depicts a single rotating magnetic domain state, according to one embodiment.

In order to examine the characteristics of closure magnetic domains, a micromagnetic simulation was performed in a conducted experiment. The magnetization rotating state was examined by segmenting a 40 nm×40 nm×12 nm FGL into cubes having 4 nm sides, and successively solving an Landau-Lifshitz-Gilbert (LLG) equation including a spin torque term. It was apparent from the results that, in the closure magnetic domain state, the FGL is split into four magnetic domains each comprising four corners. It is also noted that in-plane magnetization rotation occurs while a mutual relationship of 90° is maintained between the magnetization of adjacent magnetic domains as depicted in FIG. 9. It was also clear that the generation of closure magnetic domains in the FGL occurred readily following magnetization inversion of the polarization layer when the main magnetic pole polarity changed. It is suspected that when the magnetization inversion of the polarization layer is delayed due to inversion of the gap magnetic field, the orientation of the gap magnetic field and the spin torque matches. Corresponding to the high-frequency output maximum single domain state and closure domain state configurations depicted in FIGS. 10A and 10B, respectfully, a resulting state is established in which the magnetization from the laminated layer surface of the FGL rises markedly. FIGS. 10A-10B additionally include the gap field $H_{gap}$ direction, as well as the spin-torque STQ direction.

Figure 11:
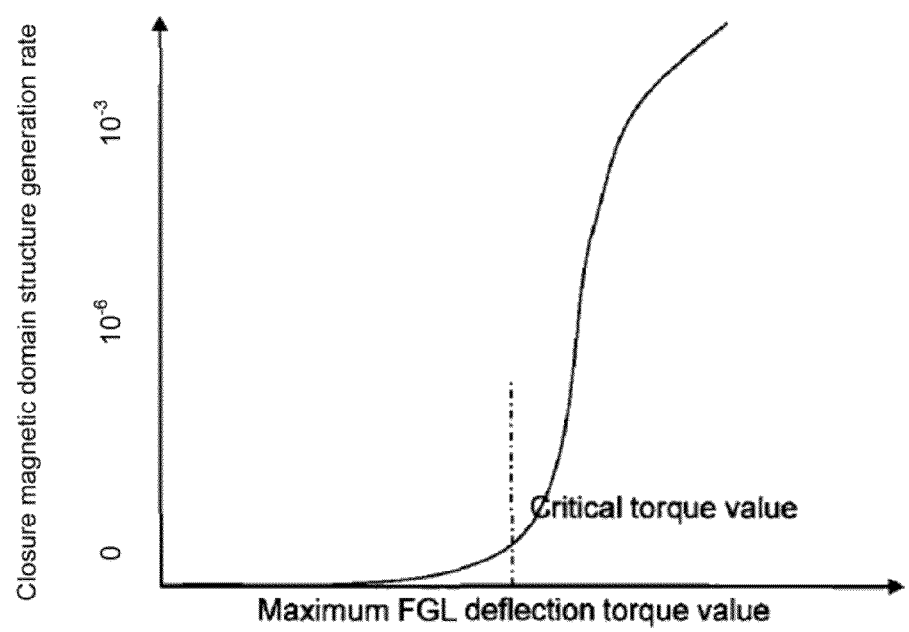
FIG. 11 is a graph showing the closure magnetic domain structure generation rate according to one embodiment.

Furthermore, when the sum of the gap magnetic field is taken and the spin torque is distinguished as the "FGL deflection torque," closure magnetic domains tend to be generated readily when the maximum value of the FGL deflection torque exceeds a critical torque value, as shown in the graph of FIG. 11. According to the graph, it may be seen that at the critical torque value, the FGL magnetization generally inclines at an angle of about 45° from the axis of rotation in some approaches.

Figure 12A:
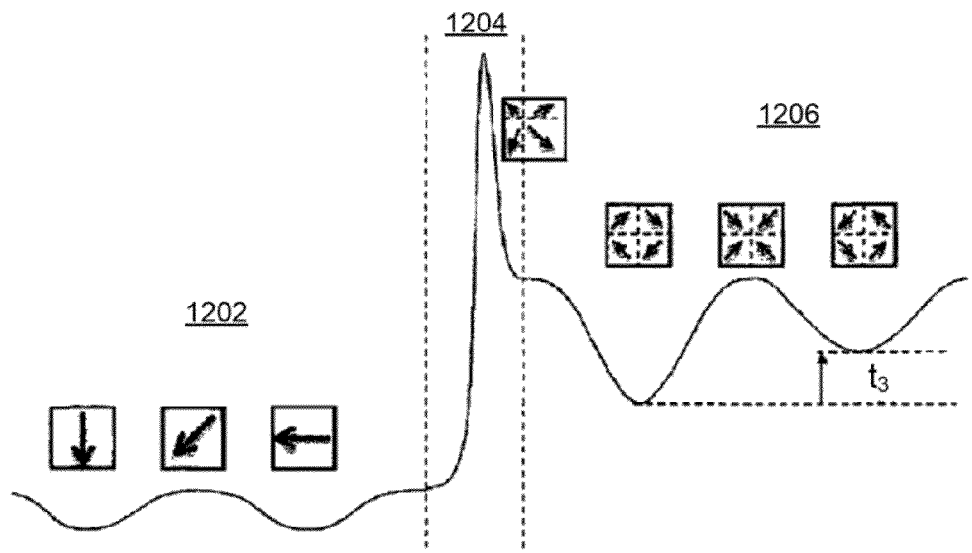
FIG. 12A shows a graph and schematic diagrams showing the relationship between magnetization state and free energy, according to one embodiment.
Figure 12B:
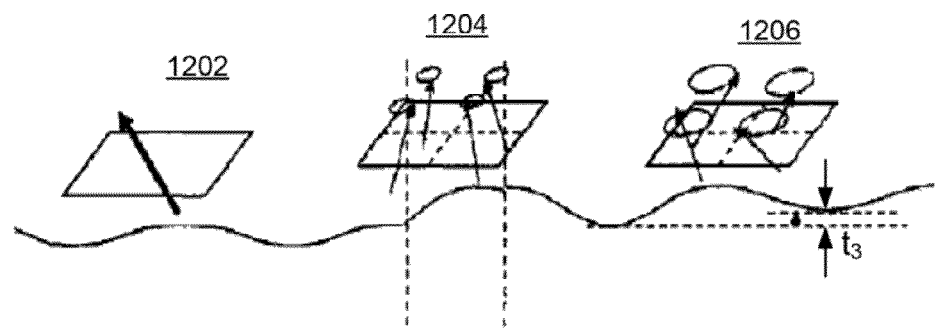
FIG. 12B shows a graph and schematic diagrams showing the relationship between magnetization state and free energy, according to one embodiment.

Thereupon, with the information gathered about the magnetization state from the aforementioned simulation, an examination of the free energy was conducted and is displayed in FIGS. 12A-12B. FIGS. 12A-12B include the single magnetic domain state 1202, the neutral state 1204, and the closure magnetic domain state 1206. Additionally, the measurement, $t_3$ of FIGS. 12A-12B, represents the energy difference produced by the current magnetic field and may differ based on the design.

The results of the examination shown in FIG. 12A exhibit the exchange coupling energy of the closure magnetic domain state, which is lower than in the single magnetic domain state because the gap magnetic field and the spin torque are balanced and opposingly orientated. Without wishing to be bound by any theory, it is believed that this result is caused by the high energy in the neutral state, producing the result that once a closure magnetic domain structure has been generated, a single magnetic domain cannot be created.

On the other hand, when the gap magnetic field and the spin torque are of the same orientation as shown in FIG. 12B, the magnetization of the FGL rises from within the plane of the lamination layer and the difference in free energy between the closure magnetic domain state and the single magnetic domain state is negligible. Accordingly, it may be understood that the shift from the single magnetic domain state to the closure magnetic domain state occurs during magnetization inversion of the polarization layer where the gap magnetic field and the spin torque are of the same orientation.

Therefore, it is apparent that, in order to suppress the generation of closure magnetic domains, a technique may advantageously be performed to ensure the maximum FGL deflection torque value does not exceed the critical torque value.

Figure 12D:
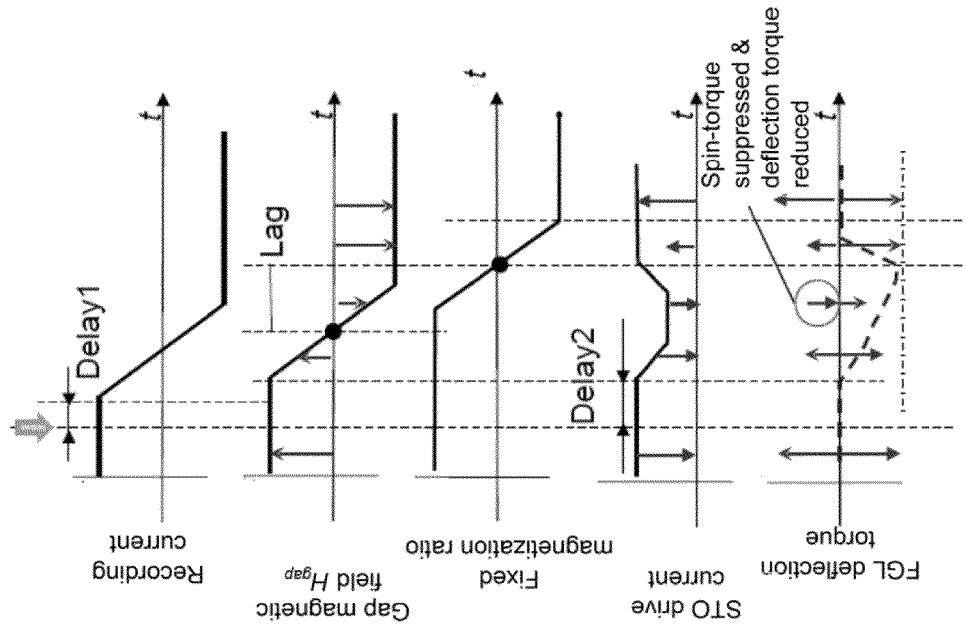
FIG. 12D is a graph displaying FGL deflection torque, according to one embodiment.
Figure 12C:
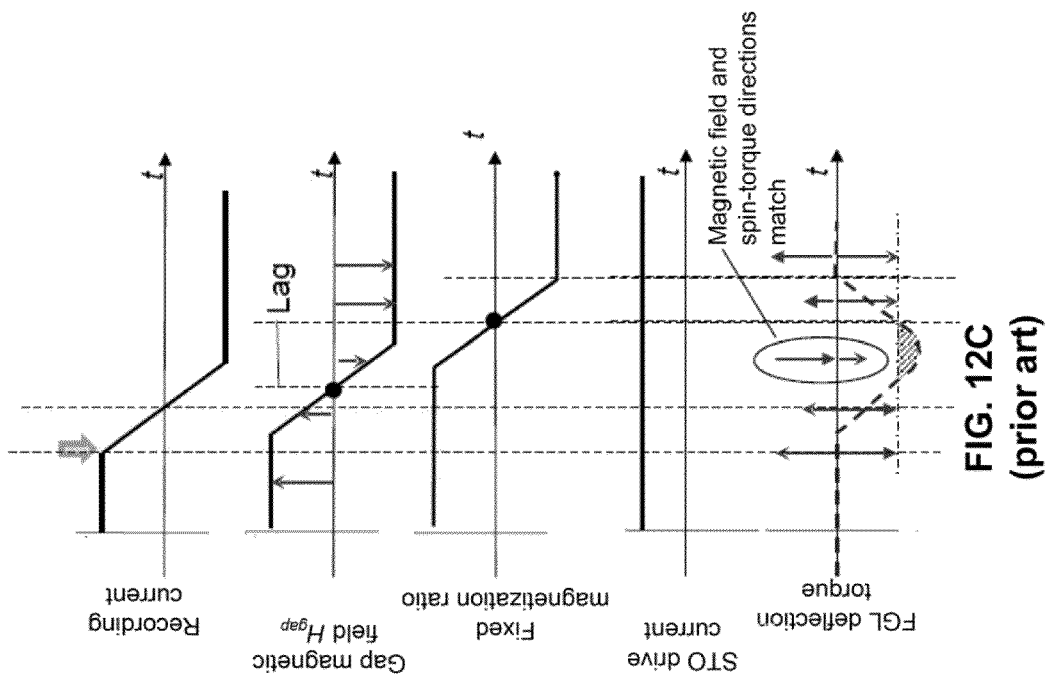
FIG. 12C is a graph displaying FGL deflection torque, according to the prior art.

FIG. 12C shows a timing chart of the recording current, gap magnetic field, polarization layer magnetization, STO drive current, and FGL deflection torque during switching of the polarity of the main magnetic pole, according to the prior art. Although inversion of the recording current is initiated as a result of the emission of a magnetic field inversion trigger from an information recording string at a time where the polarity of the main magnetic pole is inverted, the inversion of the gap magnetic field and the magnetization of the polarization layer are each slightly delayed. Conventionally, because a constant STO drive current is supplied, as shown in FIG. 12C, when a comparative delay (lag) in the inversion of the magnetization of the polarization layer with respect to the inversion of the gap magnetic field occurs, the FGL deflection torque exceeds the critical torque value.

Thereupon, as shown in FIG. 12D, when the spin torque is suppressed as a result of a reduction of the STO drive current during the period following the initiation of the inversion of the gap magnetic field until the magnetization of the polarization layer reaches 0, the FGL deflection torque does not exceed the critical torque value and, as a result, the generation of closure magnetic domains is negligible.

The Delay1 of FIG. 12D describes the time delay from the magnetic field inversion trigger until the inversion of the recording current, and constitutes an action for accurately setting the Delay2. The Delay2 describes the time delay from the magnetic field inversion trigger to the initiation of the inversion of the gap magnetic field and, at this timing, constriction of the STO drive current begins. The Delay2 may be experimentally established to an optimal value larger than Delay1 to ensure a reduction in the probability of the generation of closure magnetic domains.

Satisfying Equation 1 is one particularly effective approach to ensure that the STO current reduction amount does not result in a rise in FGL magnetization above 45'.

$$(4\pi N_{z\text{-}eff} \times M_{s\text{-}FGL} - H_{k\text{-}FGL})\cos(45°) > H_{gap} + STQ \qquad \text{Equation 1}$$

Here, $N_{z\text{-}eff}$, $M_{s\text{-}FGL}$, $H_{k\text{-}FGL}$ and $H_{gap}$ denote the effective inversion magnetic field coefficients ($N_z - N_x$) in the perpendicular (z) direction to the FGL film, the FGL saturation magnetization, and the gap magnetic field, respectively. In addition, $H_{k\text{-}FGL}$ denotes the magnetic anisotropy magnetic field in the perpendicular direction to the FGL film, taken as a negative value when a multi-layer film having negative vertical magnetic anisotropy is employed.

In one approach, the multi-layer film may include Co/Fe. The term "STQ" in Equation 1 denotes a magnetic field portion equivalent to the magnetic field produced by the spin torque which is approximately equivalent to the $H_{gap}$ during write processing. According to one embodiment, the STQ may be reduced to no less than about 30% of its value during write processing when the polarity of the main magnetic pole is switched, but of course in other embodiments could be more or less so long as the overall result is to satisfy Equation 1.

Figure 13A:
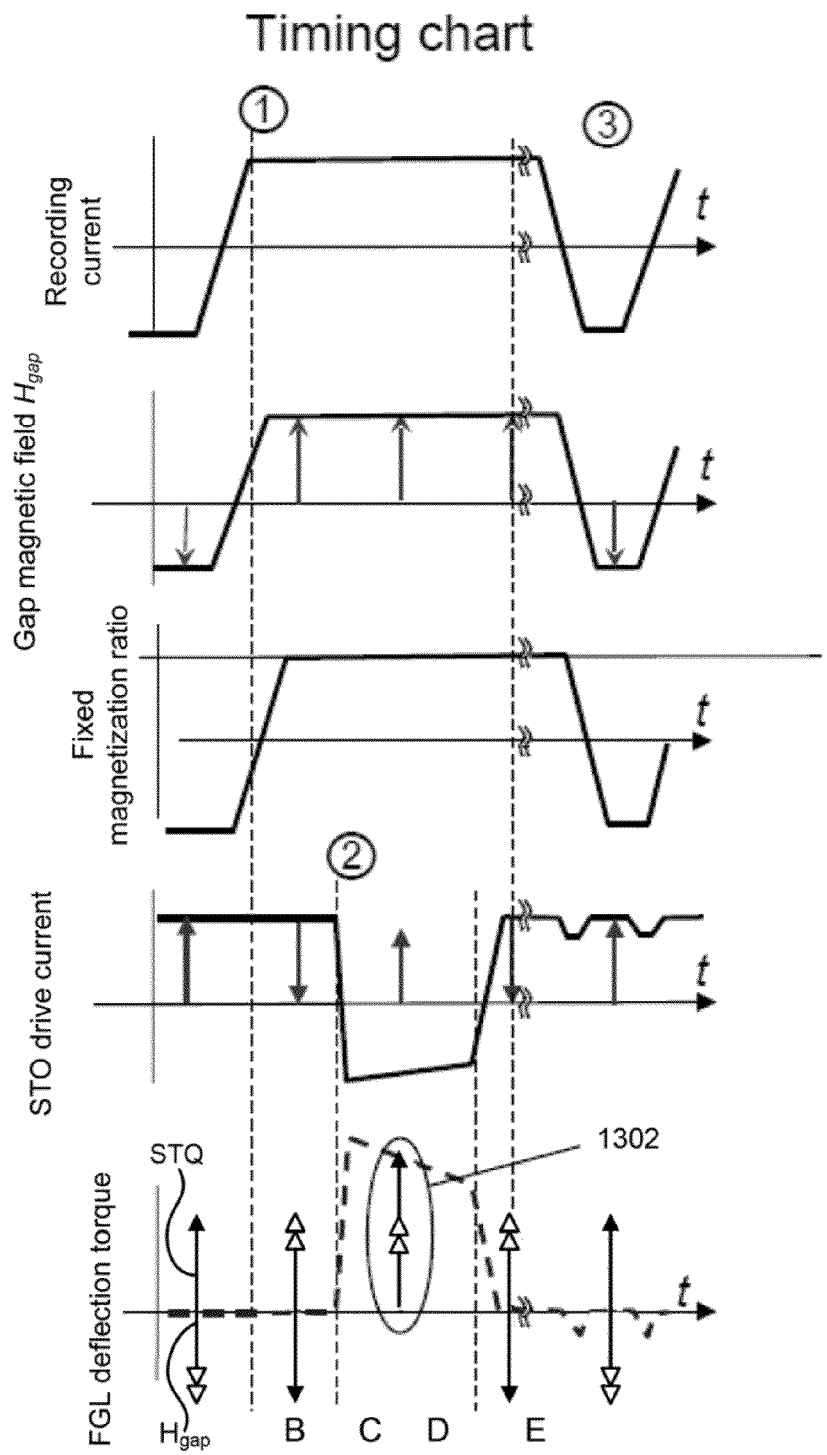
FIG. 13A is a graph displaying FGL deflection torque, according to one embodiment.

Conversely, for the removal of closure magnetic domains, the orientation of both the gap magnetic field and the spin torque are preferably the same, as shown in FIG. 13A. If the recorded information reproduction signal drops below the hitherto appropriate reproduction signal level, (1) first, the main magnetic pole excitation current (from the polarization layer side to the FGL side) and the STO current are fixed at their maximum values. At (2), an STO pulse current is applied from the FGL side to the polarization layer side to establish the orientation of the gap magnetic field and the spin torque in the same direction which, in turn, results in a significant rise in the FGL magnetization from within the plane thereof. A pulse width of the STO pulse current shorter than about 1 ns is undesirable because it may cause a drop in the rate of successful removal of the closure magnetic domain structures.

Next, the STO drive current is reduced which prevents the generation of closure magnetic domains due to the applicable recording current magnetic field and, furthermore, the STO drive current is set to the steady state value in the normal current direction to restore the FGL magnetization within the plane thereof. Finally, at (3), a test write is performed and, if an appropriate reproduction signal level has not been restored, the processing steps of (1) to (3) are repeated a predetermined number of times, such as 1 time, 3 times, 5 times, etc.

FIGS. 13B-13E depict the FGL high-frequency output maximum, magnetization states during the time periods of the FGL deflection torque graph, as shown in FIG. 13A. FIGS. 13A-13E also include the gap field $H_{gap}$ direction, as well as the spin-torque STQ direction. The value separating the B and C sections of the graph, (2), in FIG. 13A may ideally be in the order of about 0.5 ns to ensure a sufficient rise in the FGL magnetization. An appropriate reproduction signal level should be recorded in a management region of the recording medium, and should be written in a control memory when the HDD is launched. As a means for checking the generation of closure magnetic domains, a method based on reading the output level of information written across a fixed time period and regularly performing write check at an idle timing may be used.

The mounting of a MAMR-HDD described herein may be used to facilitate a control of the generation of closure magnetic domains; and/or the formation thereof as a single magnetic domain if closure magnetic domains are generated. As a result, it is possible to provide a drive system for a STO of high reliability and reduced cost that is ideal for use in super high-density MAMR devices, and to provide a magnetic recording device employing the same.

Figure 14:
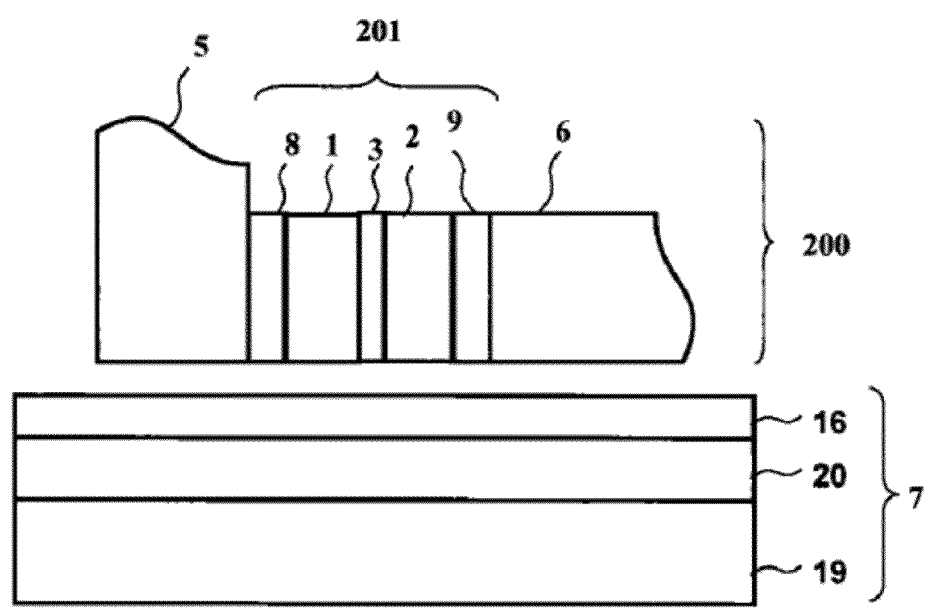
FIG. 14 depicts a partial cross-section of a recording medium and a magnetic recording head, according to one embodiment.

According to one embodiment, FIG. 14 depicts a cross-sectional schematic diagram of a recording medium 7 and a magnetic recording head 200 positioned above the recording medium 7. The magnetic recording head 200 is configured to include a magnetic circuit above the diagram plane between a main magnetic pole 5 and an opposing magnetic pole 6. The recording head 200 is configured to be essentially electrically insulated above the diagram plane. The magnetic circuit is one in which a line of magnetic force may form a closed circuit, thereby eliminating the need for fabrication from a magnetic body alone. Additionally, the magnetic circuit may be fabricated with an assist magnetic pole or similar disposed on the opposing side to the opposing magnetic pole 6 of the main magnetic pole 5. In some approaches, this design may eliminate the need for electrical insulation between the main magnetic pole 5 and the assist magnetic pole. In one approach, a coil and (copper) wire, etc., may be provided in the magnetic recording head 200 for the purpose of exciting these magnetic circuits.

Still referring to FIG. 14, a STO 201 is formed between the main magnetic pole 5 and the opposing magnetic pole 6. The STO 201 may comprise an electrode or a mechanism electrically coupled to an electrode in the main magnetic pole 5 and the opposing magnetic pole 6. As a result, the STO current flows from the main magnetic pole 5 side to the opposing magnetic pole 6 side, or flows in the reverse direction by way of a polarization layer 2. A CoFe alloy of suitably large saturation magnetization and negligible crystal magnetic anisotropy, as would be known to one of skill in the art, may be used as the material of the main magnetic pole 5 and the opposing magnetic pole 6.

The recording medium 7 may be a laminated film in one approach. In one approach, the laminated film may include a substrate 19 of a 10 nm-Ru layer positioned above a 30 nm-CoFe serving as an underlayer 20. Above the underlayer, there may also be a laminated film including the fabrication of a 4 nm-CoCrPt—SiOx layer (magnetic anisotropy magnetic field of 1.6 MA/m (20 kOe)) on a 6 nm-CoCrPt—SiOx layer (magnetic anisotropy magnetic field of 2.4 MA/m (30 kOe)) serving as a recording layer 16.

In another approach, the STO 201 may be formed of laminated layers adjacent to the main magnetic pole 5 from a non-magnetic spin scattering layer 8, an FGL 1, a non-magnetic spin-transporting layer 3, a polarization layer 2 and a second non-magnetic spin scattering layer 9. In one approach, the STO 201 may span the entire distance between the magnetic pole 5 and the opposing magnetic pole 6.

According to one embodiment, the STO element comprising the non-magnetic spin scattering layer 8 to the second non-magnetic spin scattering layer 9 may be characterized as a columnar structure that extends in the left-right direction along an ABS of the diagram, with an oblong-shaped cross-section. The adoption of this oblong shape results in the generation of shape anisotropy in the track width direction and, accordingly, even if there is an in-plane component of the FGL 1 in the delayed main magnetic field from the main magnetic pole, the in-plane magnetization rotation of the FGL 1 is able to be performed smoothly. In various approaches, the columnar structure may be arranged such that the non-magnetic spin scattering layer 8 may be disposed adjacent the polarization layer 2 on a side opposite the FGL 1. Moreover, the non-magnetic spin-transporting layer 3 may be disposed between the FGL 1 and the polarization layer 2, and the second non-magnetic spin scattering layer 9 may be disposed adjacent the FGL 1 and on a side opposite the polarization layer 2. As a result, the main magnetic pole 5 and FGL 1 may be brought into closer proximity.

Incidentally, when the delayed magnetic field from the main magnetic pole is small, the cross-sectional shape of this structure may be square. The length (w) of the side along the ABS of these cross-sectional shapes is an important factor in determining the recording track width and, in this exemplary embodiment, is about 40 nm long. In MAMR, a recording medium of large magnetic anisotropy may not be able to record unless the recording magnetic field from a main magnetic pole 5 aligned with the high-frequency magnetic field from the FGL 1 are employed. Accordingly, the width and the thickness of the main magnetic pole 5 (length in the direction of motion of the head) is able to be set larger, resulting in the generation of a larger recording magnetic field. In this exemplary embodiment, a recording magnetic field of approximately 0.9 MA/m is able to be produced by using a main magnetic pole width of about 80 nm and a thickness of about 100 nm.

In one embodiment, an about 9 nm (Co/Ni) n-multi-layer film may be employed as the polarization layer 2, having n layers. In one approach, a structure of length from the end surface of the main magnetic pole 5 to the end surface of the opposing magnetic pole 6 being about 40 nm and the FGL 1 having a height of about 38 nm may be used. In another approach, the magnetic field may be applied to the STO. In one still another approach, a 13 nm thick CoFe alloy of large saturation magnetization and negligible crystal magnetic anisotropy may be used for the FGL 1. This exemplary embodiment, when analyzed using three-dimensional magnetic field analysis software, was found to be approximately 0.8 MA/m (10 kOe).

High-speed in-plane magnetization occurs along the layer of the FGL 1, and the delayed magnetic field from the magnetic pole that appears in the ABS and the side surfaces acts as a high-frequency magnetic field. According to various approaches, the FGL 1 may include a material of large saturation magnetization and may also have negative vertical magnetic anisotropy such as an n multi-layer film (Co/Fe). The use of this material stabilizes the in-plane rotation of the FGL 1 magnetization.

Because the FGL 1 lies between the main magnetic pole 5 and the polarization layer 2, in order to produce spin torque oscillation when writing on the recording medium, the STO 201 of this exemplary embodiment may supply an STO current from the opposing magnetic pole 6 side to the main magnetic pole 5 side. According to a preferred approach, the current may be direct current (DC).

When a magnetic flux is inflowing from the main magnetic pole 5 side, the polarization layer 2 magnetization is orientated to the left in FIG. 14. The chirality of the magnetization of the FGL 1 is anti-clockwise as seen from the upstream side of the STO current. Additionally, a rotating magnetic field with the same orientation as the precession of the magnetization of the recording medium may be applied. When a magnetic field is inflowing from the main magnetic pole 5, the polarization layer 2 magnetization is oriented to the right, as shown in FIG. 14.

The chirality of the FGL 1 magnetization is clockwise as seen from the upstream side of the high-frequency current. Additionally, a rotating magnetic field of orientation the same as the precession motion direction of the magnetization of the recording medium inverted by the magnetic field to the main magnetic pole 5 may be applied. Accordingly, the rotating high-frequency magnetic field generated from the FGL 1 is not dependent on the polarity of the main magnetic pole 5. Moreover, a magnetization inversion may be assisted by the main magnetic pole 5. However, without wishing to be bound by any theory, it is believed that this effect is not possible using previous attempts at high-frequency magnetic fields in which the orientation of the spin torque is not changed by the polarity of the main magnetic pole 5.

It is further believed that the larger the STO current, the larger the resulting spin torque. Moreover, an even larger spin torque is exerted when an about 1 nm thick Co, CoFeB, etc., layer of large polarization is inserted between a non-magnetic spin-transporting layer 3 and an adjacent layer. According to one illustrative embodiment, an about 2 nm Cu layer may be employed as the non-magnetic spin-transporting layer 3. Moreover, an about 3 nm Ru may be employed as the non-magnetic spin scattering layers 8, 9. The same action and effect is believed to be achieved employing Pd, Pt, or the like. The scattering of the spin information by the non-magnetic spin scattering layers 8, 9 has the effect of ensuring the prevention of interaction by way of the spin torque between the STO and the main magnetic pole 5 or the opposing magnetic pole 6. However, in the absence of the non-magnetic spin scattering layers 8, 9, the STO oscillation is unstable.

Figure 15:
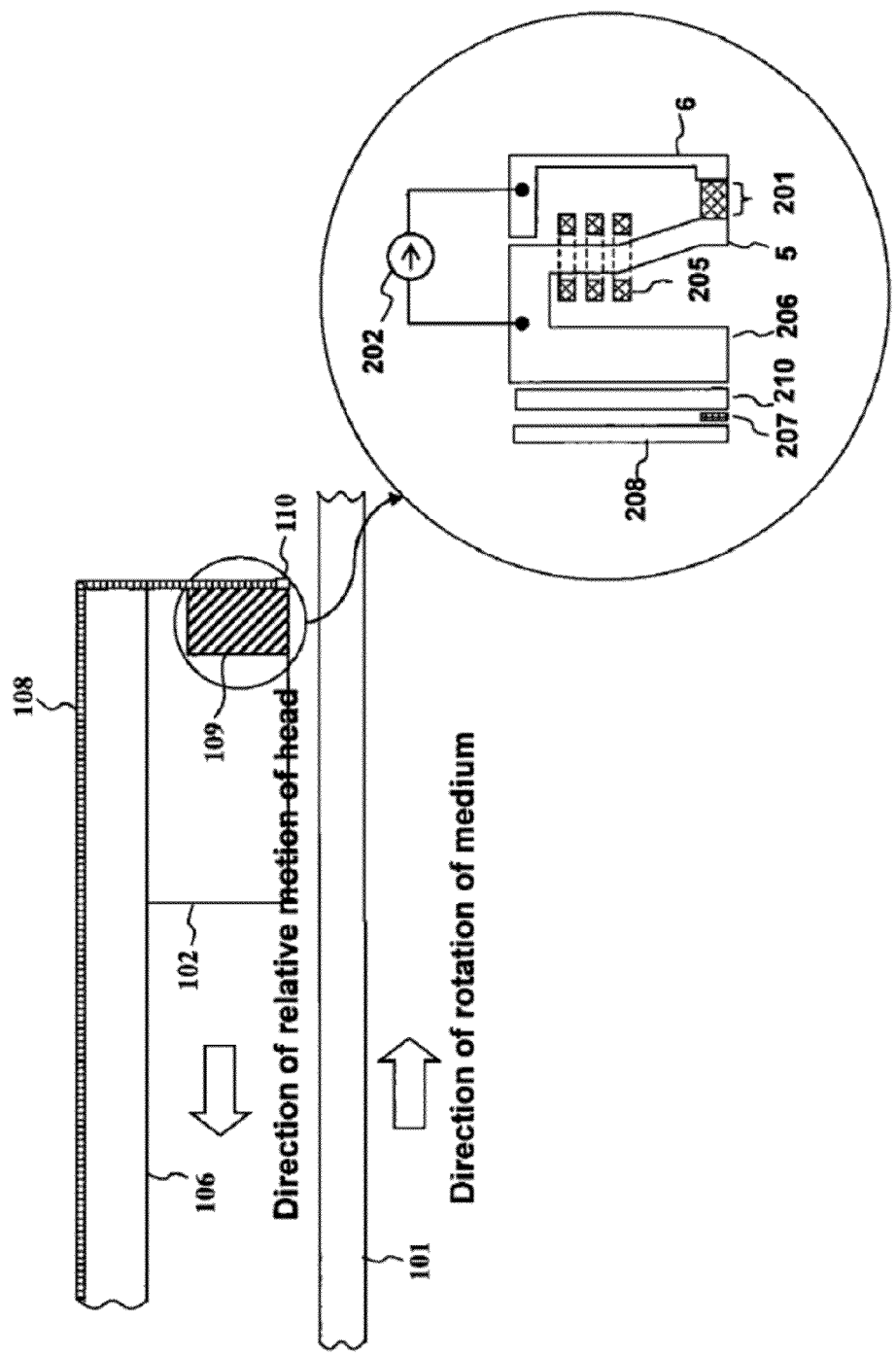
FIG. 15 depicts a partial cross-section of a recording head, according to one embodiment.

As shown in the schematic diagram of FIG. 15, in one illustrative embodiment, a magnetic head slider 102 is attached to a suspension 106. According to one approach, the magnetic head slider 102 includes a recording/reproducing portion 109. According to another approach, the recording/reproducing portion 109 includes an STO 201. In one approach, a spin-stand was employed to examine the recording/reproduction characteristics of the present embodiment.

According to the illustrative embodiment depicted in FIG. 15, the recording/reproducing portion 109 is constituted from a recording head portion and a reproduction head portion. As shown in the expanded view of FIG. 15, the recording head portion includes, amongst other components, an assist magnetic pole 206, the STO 201 arranged between the main magnetic pole 5 and the opposing magnetic pole 6, and a coil 205 for exciting the main magnetic pole. The reproduction head portion is constituted from, amongst other components, a reproduction sensor 207 arranged between a lower shield 208 and an upper shield 210. In some instances, the magnetic pole 206 and the upper shield 210 are combined. The current of the constituent components of the recording/reproducing portion 109 is supplied by way of a cable 108, and is supplied to the constituent components from a terminal 110. While this expanded view schematically shows the STO power supply 202 for supplying current to the STO 201, the STO power supply 202 may conventionally be disposed externally of the slider 102, and the STO current from the STO power supply 202 may be supplied to the STO 201 by way of the cable 108.

Figure 16:
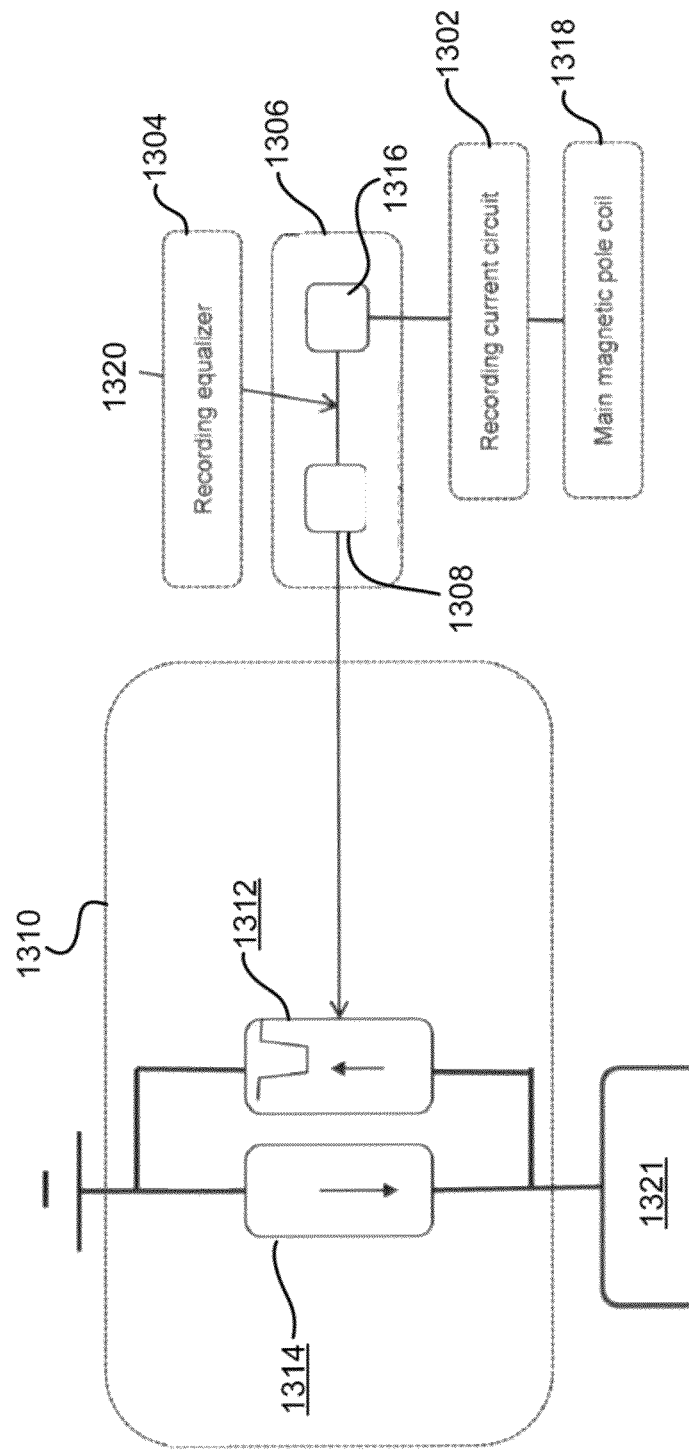
FIG. 16 depicts a circuit block diagram of a MAMR device including a spin-torque oscillator (STO) element, according to one embodiment.

Referring now to FIG. 16, the STO power supply circuit, and a timing-control circuit for controlling the same are depicted according to one illustrative embodiment. As shown in FIG. 16, the data storage system includes a main magnetic pole coil 1318, which is connected to a recording current circuit 1302. The main magnetic pole polarity inversion trigger, received from an information recording string 1320, is emitted from a recording equalizer 1304 and branched by a timing control circuit 1306. According to one approach, the trigger arrives by way of a first delay circuit 1308 and/or a second delay circuit 1316 at a main magnetic pole drive circuit and the STO power supply circuit 1310, connected to an STO 1321. The recording current circuit possesses a function for inverting the current polarity, upon receipt of the aforementioned trigger. The STO power supply 1310 possesses a function by which the aforementioned trigger is received by a pulse current power supply 1312, and a pulse current is generated. The orientation of this pulse current is opposite the orientation of current supplied by the constant current power supply 1314. Accordingly, the current flowing to the STO may only be constricted while the pulse current is being supplied to the STO element.

During recording, the timing at which the polarity of the main magnetic pole is inverted is emitted as a trigger from the information recording string. Additionally, the aforementioned trigger is branched and emitted by way of the delay circuit to the main magnetic pole drive circuit and the STO power supply circuit. As a result, synchronization between the polarity inversion of the main magnetic pole and STO current modulation is realized. Moreover, the STO power supply receives the trigger pulse, and sums the directionally opposite pulse current and the constant current, temporarily reducing the current supplied to the STO element. Notably, even though the system sums multiple currents which may flow in different directions according to many embodiments, the net current supplied to the STO element remains substantially unidirectional, particularly during a write operation. The delay time of first delay circuit 1316 and second delay circuit 1308 is regulated in such a way that an inverse relationship is maintained between the STO current and the main magnetic pole excitation current during a write operation, and the main magnetic pole polarity is substantially as shown in FIG. 17, in one embodiment.

Moreover, in various embodiments, the voltage across the STO element at all times other than during a write operation is less than about 70% of the voltage across the STO element during a write operation.

Figure 13B:
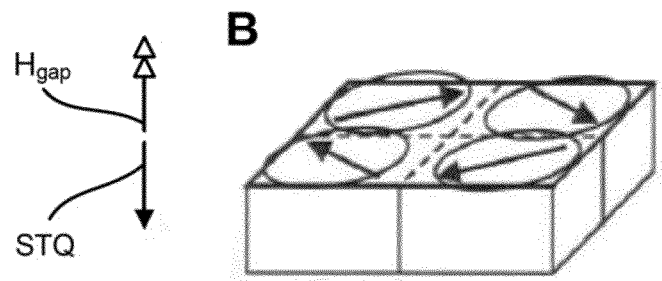
FIG. 13B depicts magnetization states during a FGL high-frequency output maximum, according to one embodiment.
Figure 13C:
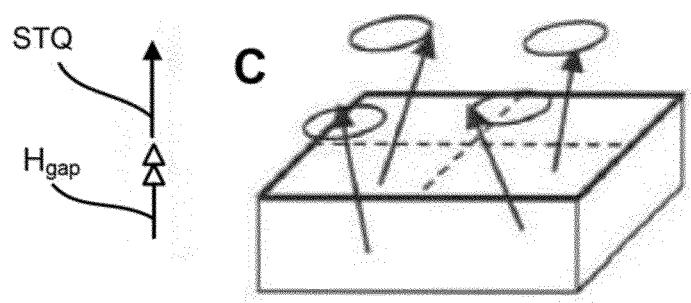
FIG. 13C depicts magnetization states during a FGL high-frequency output maximum, according to one embodiment.
Figure 13D:
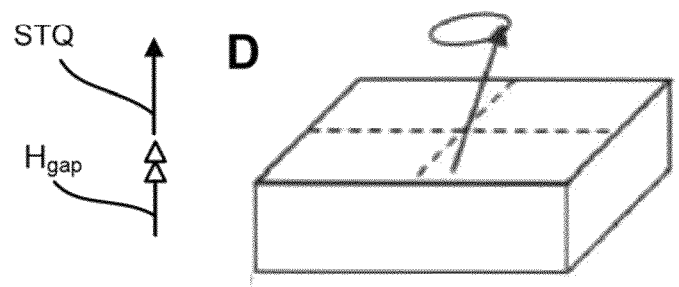
FIG. 13D depicts magnetization states during a FGL high-frequency output maximum, according to one embodiment.
Figure 13E:
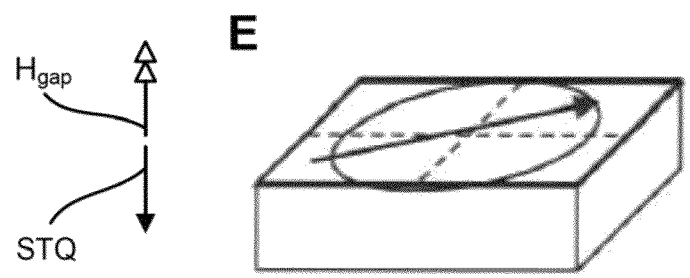
FIG. 13E depicts magnetization states during a FGL high-frequency output maximum, according to one embodiment.
Figure 17:
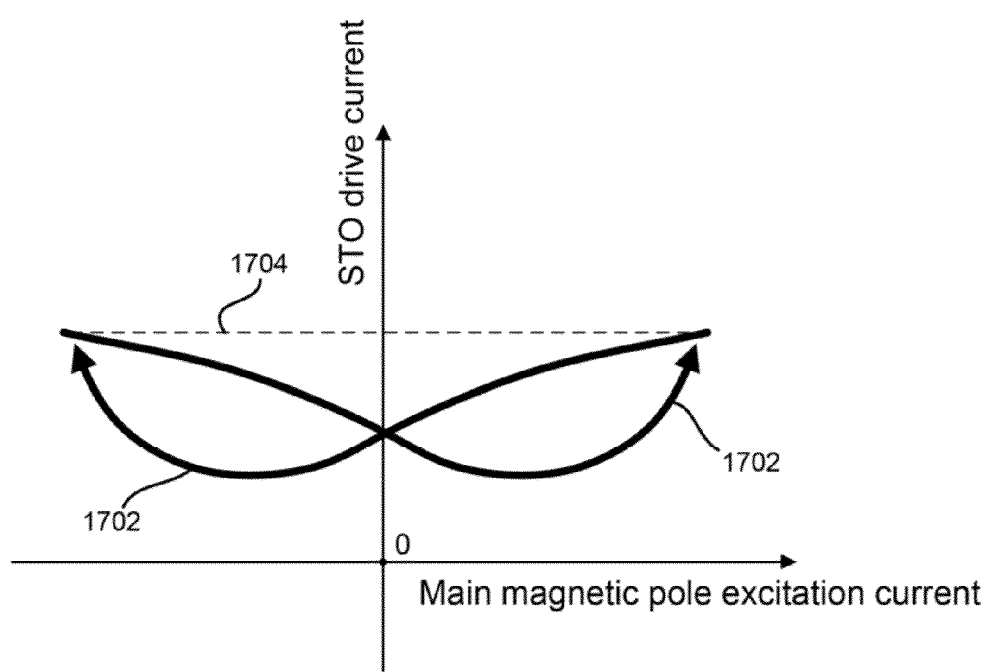
FIG. 17 is a graph illustrating the relationship between main magnetic pole excitation current and STO current, according to one embodiment.

According to the embodiment depicted in FIG. 17, the reduction in the main magnetic pole excitation current (or magnetic field) occurs prior to the reduction in the STO current. Lines 1702 represent the write operation results obtained during testing of a preferred embodiment, and line 1704 represents an unfavorable conventional write operation. Without wishing to be bound by any theory, it is believed that this is because, the polarization layer magnetization is inverted, as shown in FIG. 13B. It is also believed that this causes the timing for reversal of the spin torque orientation to be delayed even more than the main magnetic pole excitation current (or magnetic field). Due to the increased delay, it is believed that the STO current must be constricted to suppress the FGL deflection torque. In addition, the pulse width generated from the pulse current power supply may be lengthened so that the STO current is constricted from the initiation of magnetic field inversion until completion of the polarization layer magnetization inversion. However, in no event should the pulse current pulse width be greater than the duration of the main pole magnetic moment inversion process.

Figure 18:
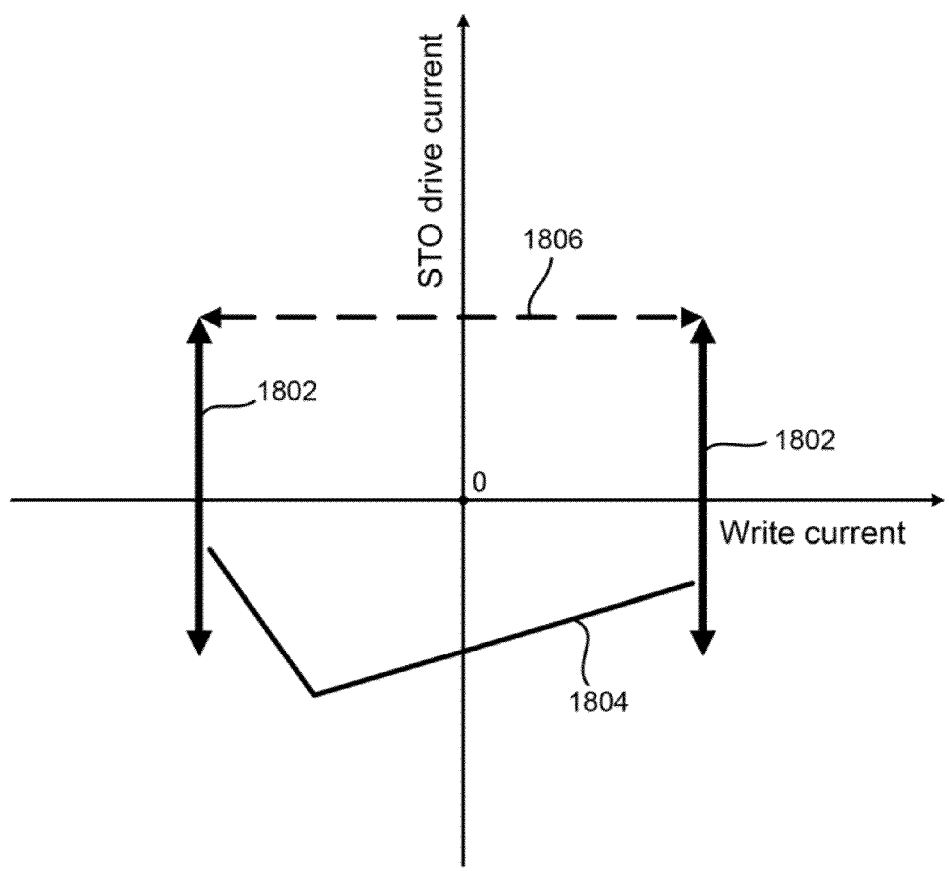
FIG. 18 is a graph illustrating the relationship between write current and STO current, according to one embodiment.

In order to remove the thus-generated closure magnetic domains, the current value of the pulse current power supply of FIG. 16 may be performed using a larger value than the current value of the steady-state current supply. In one approach, this design may be referred to as a negative current pulse. The delay time of the delay circuit 1308 is set to a value sufficient to ensure, that the STO current is reversed after the complete inversion of the polarization layer magnetization. As depicted in FIG. 18, the relationship of main magnetic pole excitation current with STO current, also known as the removal of the closure magnetic domains, may be implemented to the extent that magnetic domains are generated. Lines 1802 represent the results obtained during testing of a preferred embodiment. Additionally, lines 1804 and 1806 represent the magnetic domain structure removal operation and a unfavorable conventional write operation respectively.

According to a conducted experiment, for a closure magnetic domain removal operation performed 500×, using the head of this exemplary embodiment, the original signal/noise ratio was not recovered by the first negative current pulse 24×. Additionally, the original signal/noise ratio was not recovered by the second current pulse only 1×. Furthermore, the signal/noise ratio was able to be completely recovered when 3 or more negative current pulses were imparted. Additionally, magnetic recording was performed at a head medium relative speed of 20 m/s, a magnetic spacing of 7 nm, a track pitch of 50 nm and, furthermore, reproduction thereof was performed using a GMR head of a 15 nm shield interval. While recording a signal of 512 MHz and 1300 kFCI using altered Voltage across the STOs, the maximum signal/noise ratio obtained was 13.1 dB, using an Voltage across the STO of 150 mV.

While the Voltage across the STO was measured during magnetic field inversion as a conditional parameter, the signal/noise ratio was examined following an inversion of respective 1000000× magnetic fields. As a result, the signal/noise ratio dropped to approximately 5 dB; 11× when the Voltage across the STO during magnetic field inversion was kept at 150 mV. Once the signal/noise ratio had dropped, even if a recording magnetic field of an Voltage across the STO stronger than normal was applied, the original signal/noise ratio could not be restored. Deterioration of the signal/noise ratio occurred 5× when the Voltage across the STO was set to 135 mV during magnetic field inversion, 2× when set to 120 mV, and 0× when set to 105 mV. These findings provided confirmation that, when the Voltage across the STO drops during the recorded magnetic field inversion of the present invention, the generation of closure magnetic domains can be suppressed, and output drop can be reduced.

Figure 19A:
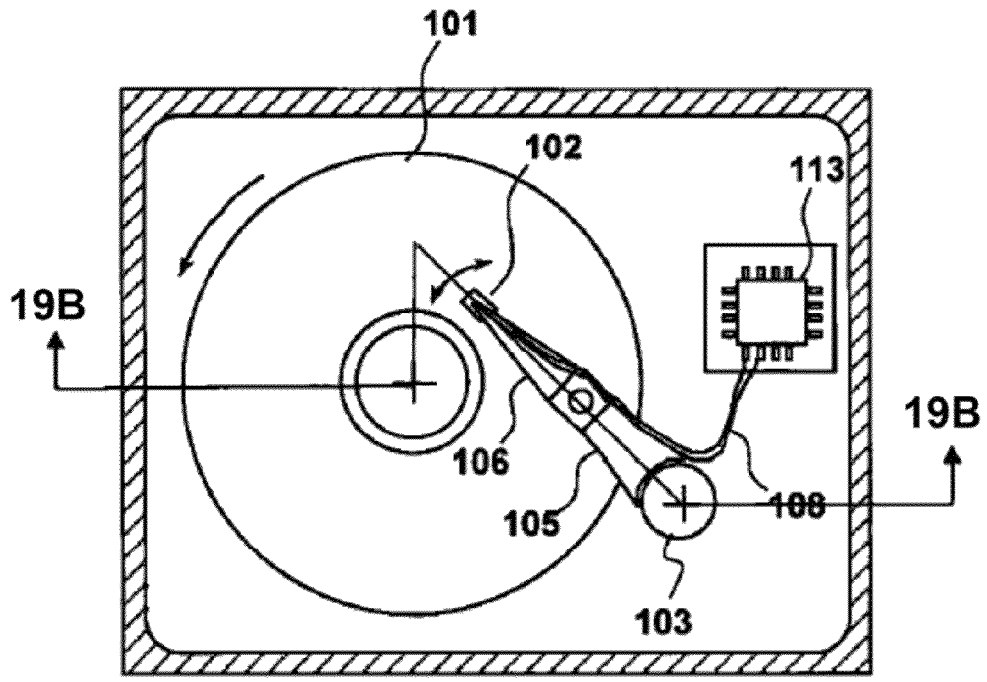
FIG. 19A depicts a magnetic recording device, according to one embodiment.
Figure 19B:
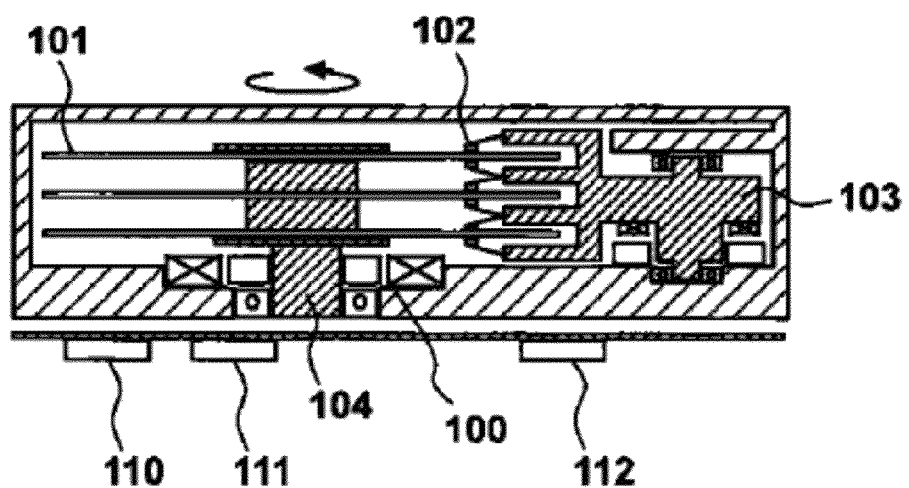
FIG. 19B depicts a cross-sectional view of a magnetic recording device, according to one embodiment.

FIGS. 19A and 19B depict schematic diagrams showing the configuration of the magnetic recording device according to one preferred illustrative embodiment. FIG. 19A depicts an upper surface view, while FIG. 19B depicts a cross-sectional view along the line A-A thereof. The recording medium 101 is fixed by a rotating shaft bearing 104, and is rotated by a motor 100. While FIG. 19B shows one example in which three magnetic disks and six magnetic heads are mounted, at least one, at least two, etc., magnetic disks and at least one, at least two, etc., magnetic heads need only be provided. The recording medium 101 defines a disk shape, and a recording layer is formed on both surfaces thereof. The slider 102 moves in the approximately radial direction along the rotating recording medium surface, and comprises a recording/reproducing portion in its distal-end portion. The recording/reproducing portion is constituted like the structure shown in FIG. 19A-19B with the main magnetic pole and the STO provided in the recording portion.

Furthermore, the suspension 106 is supported on a rotary actuator 103 by way of an arm 105. The suspension 106 functions to press the slider 102 against the recording medium 101, or pull it therefrom at a predetermined load. The current for driving the constituent components of the magnetic head is supplied from an integrated circuit (IC) amplifier 113 by way of the cable 108. The processes of the recording signal supplied to the recording head portion and the reproduction signal detected from the reproduction head portion are implemented by a read/write channel IC 112 which is shown in FIG. 19B. In addition, the control operation of the magnetic recording device as a whole is based on the execution of a disk controller program stored in the memory 111 by a processor 110. Accordingly, the present invention is actualized using the processor 110, the memory 111, and the read/write channel IC 112.

The recording head and recording medium described above were assembled in a magnetic disk device as shown in FIG. 19A-19B. According to a conducted performance evaluation of magnetic field inversion using an information recording/reproduction device, information transfer speed were measured at 1.0 Gbit/s, while information recording capacity was measured at 2 TB (I TBit/in$^2$). In addition, the Voltage across the STO during magnetic field inversion was set to 70% of the Voltage across the STO for writing and the error rate was continuously measured for 100 hours; however no deterioration in either the error rate or the signal/noise ratio was observed.

Furthermore, the error rate was measured for the Voltage across the STO during magnetic field inversion set to 90% of the voltage across the STO for writing. After just 2 hours, the error rate and signal/noise ratio were found to have markedly deteriorated; and upon implementation of the operation for the removal of the closure magnetic domains in response thereto, the error rate and signal/noise ratio were restored. Furthermore, in this restored state, error rate measurement was continuously performed for 100 hours with the voltage across the STO while the magnetic field inversion was reset to 70% of the voltage across the STO for writing. As a result, no deterioration in either error rate or signal/noise ratio was observed.

Notably, the present invention is not limited to the embodiment described above and includes a range of modifications thereto. For example, the embodiment described above is described in detail in order to ensure ease of understanding of the present invention, and the present invention is not limited to embodiments in which the entire configuration is described in such detail. In addition, a portion of the configuration of the embodiment may be replaced by the configuration of another embodiment and, furthermore, the configuration of one embodiment may be added to the configuration of another embodiment. In addition, the configuration of all embodiments may be supplemented, deleted or replaced with other configurations.

It should also be noted that methodology presented herein for at least some of the various embodiments may be implemented, in whole or in part, in computer hardware, software, by hand, using specialty equipment, etc. and combinations thereof.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

The invention claimed is:
1. A magnetic data storage system, comprising:
 a main pole power supply adapted for supplying an excitation current to a main pole coil;
 a microwave-assisted magnetic recording (MAMR) device comprising a spin-torque oscillator (STO) element, the STO element comprising a field generation layer (FGL) and a polarization layer;

a timing-control circuit adapted for determining a duration of a main pole magnetic moment inversion process and signaling a start of the main pole magnetic moment inversion process; and a current-regulating circuit comprising an STO power supply adapted for supplying current to the STO element, wherein the STO power supply prevents degradation of a single rotating magnetic domain structure in the FGL into a closure magnetic domain structure in the FGL.

2. The magnetic data storage system as recited in claim 1, wherein the current-regulating circuit further comprises a current-regulating device, wherein the current-regulating device is adapted for regulating the current supplied to the STO element for the duration of the main magnetic pole magnetic moment inversion process.

3. The magnetic data storage system as recited in claim 2, wherein the current regulating device comprises a pulse power supply positioned in parallel to the STO power supply.

4. The magnetic data storage system as recited in claim 3, wherein the pulse power supply supplies a pulse current in a direction opposite to a direction of the current supplied to the STO element.

5. The magnetic data storage system as recited in claim 3, wherein the pulse power supply supplies a pulse current having a pulse width based on the duration of the main pole magnetic moment inversion process.

6. The magnetic data storage system as recited in claim 5, wherein the pulse width is greater than about 1 nanosecond, and no greater than the duration of the main pole magnetic moment inversion process.

7. The magnetic data storage system as recited in claim 1, wherein the current supplied to the STO element is supplied substantially unidirectionally during a write operation.

8. The magnetic data storage system as recited in claim 1, wherein the current supplied to the STO element is supplied to the polarization layer via the FGL.

9. The magnetic data storage system as recited in claim 1, wherein a voltage across the STO element at any time other than during a write operation is less than about 70% of the voltage across the STO element during the write operation.

10. The magnetic data storage system as recited in claim 1, further comprising:
a magnetic medium;
a drive mechanism for passing the magnetic medium over at least one magnetic head slider;
at least one magnetic head comprising the MAMR device; and
a controller electrically coupled to the at least one magnetic head slider for controlling operation of the at least one magnetic head slider, the controller comprising the timing-control circuit.

11. The magnetic data storage system as recited in claim 1, wherein the STO element comprises:
a non-magnetic spin scattering layer disposed adjacent the polarization layer on a side opposite the FGL;
a non-magnetic spin-transporting layer disposed between the FGL and the polarization layer; and
a second non-magnetic spin scattering layer disposed adjacent the FGL and on a side opposite the polarization layer.

12. A method comprising:
supplying an excitation current to a main pole coil;
supplying a current to a spin-torque oscillator (STO) element of a microwave-assisted magnetic recording (MAMR) device, the STO element comprising a field-generation layer (FGL) and a polarization layer;
determining a duration of a main pole magnetic moment inversion process;
signaling a start of the main pole magnetic moment inversion process; and
regulating the STO current for the duration of the main pole magnetic moment inversion process,
wherein regulating the STO current prevents degradation of a single rotating magnetic domain structure in the FGL into a closure magnetic domain structure in the FGL.

13. The method as recited in claim 12, wherein regulating the current supplied to the STO element comprises supplying a pulse current to the STO element.

14. The method as recited in claim 13, wherein the pulse current has a pulse width based on the duration of the main pole magnetic moment inversion process.

15. The method as recited in claim 14, wherein the pulse width is greater than about 1 nanosecond and no greater than the duration of the main pole magnetic moment inversion process.

16. The method as recited in claim 12, wherein regulating the current supplied to the STO element comprises supplying a pulse current in parallel and in a direction opposite to a direction of a constant current supplied to the STO element by a STO power supply.

17. The method as recited in claim 12, wherein the current supplied to the STO element is supplied to the polarization layer via the FGL.

18. The method as recited in claim 12, wherein the current supplied to the STO element is supplied substantially unidirectionally during a write operation.

19. The method as recited in claim 12, supplying current to the STO element comprises reducing a voltage across the STO element at all times other than during a write operation to less than about 70% of the voltage across the STO element during the write operation.

20. The method as recited in claim 12, further comprising transforming a closure magnetic domain structure in the FGL into a single rotating magnetic domain structure in the FGL by:
supplying current to the polarization layer via the FGL, the current comprising a pulse current and a constant current,
wherein supplying the pulse current to the polarization layer increases the magnetization state of the FGL, thereby establishing a common orientation of a gap magnetic field and a spin torque, which establishes a single rotating magnetic domain in the FGL.

* * * * *